March 18, 1969   J. F. ZABORNEY   3,433,351
CIRCULAR DISPENSING DEVICE FOR BATTERIES Filed Sept. 15, 1967

INVENTOR.
JOHN F. ZABORNEY
BY
ATTORNEY

March 18, 1969   J. F. ZABORNEY   3,433,351
CIRCULAR DISPENSING DEVICE FOR BATTERIES
Filed Sept. 15, 1967   Sheet 2 of 2

INVENTOR.
JOHN F. ZABORNEY
BY
ATTORNEY

United States Patent Office 3,433,351
Patented Mar. 18, 1969

3,433,351
CIRCULAR DISPENSING DEVICE FOR BATTERIES
John F. Zaborney, North Tarrytown, N.Y., assignor to P. R. Mallory & Co., Inc., Indianapolis, Ind., a corporation of Delaware
Filed Sept. 15, 1967, Ser. No. 667,948
U.S. Cl. 206—37    4 Claims
Int. Cl. A45c 11/00

ABSTRACT OF THE DISCLOSURE

A flat, circular-shaped dispensing device for electric cells or batteries having two rotatably connected parts between which there are insulatedly supported a plurality of equidistantly spaced batteries. An opening, normally closed by a snap cap, is provided in one of the said parts through which batteries may be sequentially dispensed or reinserted. The two ends of the batteries constitute the respective terminals thereof, one of which is accessible through a small aperture in one of the parts of the device and the other of which may be brought into contact with a metallized surface of a card sandwiched between the two parts of the device. Thus, the voltage or other electrical characteristics of each battery can be checked without removing such battery from the dispensing device.

BACKGROUND OF THE INVENTION

This invention relates to dispensing devices, and, more particularly, to devices for dispensing small batteries used in hearing aids and similar electronic equipment.

Although the current consumption of modern hearing aids is quite low, and the efficiency of the batteries used therein increased steadily in recent years, it was considered desirable by most users to carry a few batteries with them at all times so that the battery could be replaced with a fresh one as soon as the need therefor arose. Conventional dispensing devices developed for dispensing pills and similar non-electrical applications were found unsuitable for dispensing batteries due to the danger of accidentally short-circuiting the batteries either during storage or dispensing. Also, prior dispensing devices did not allow checking the voltage and other electrical characteristics of the batteries unless the batteries were first removed therefrom.

It is an object of the invention to improve dispensing devices.

It is another object of the present invention to provide a novel and improved dispensing device, particularly suitable for storing and for sequentially dispensing hearing aid batteries.

It is a further object of the invention to provide a dispensing device for insulatedly holding and individually dispensing a desired plurality of batteries, while exposing the terminals of all batteries to permit checking the electrical characteristics thereof without withdrawing such batteries from the dispenser.

Other objects and advantages of the invention will become apparent from the following description, taken in conjunction with the accompanying drawing; in which:

SUMMARY

Broadly stated, in accordance with the principles of the present invention, there is provided a flat, circular-shaped dispensing device for batteries, having a lower half and an upper half. The lower half of the device is formed of flexible plastics, such as (white) opaque, medium density polyethylene, with a raised circular opening through which batteries may be individually dispensed or reinserted. The opening is closed by means of a self-hinged snap cap. The lower half of the device is rotatably attached to the upper half thereof by means of an integrally formed mushroom-shaped stud locking through a hole in the center of the upper half. The entire lower half, including mushroom-shaped stud and self-hinged snap cap, is molded in one piece.

The upper half of the device is formed of transparent, rigid plastic, such as general purpose polystyrene, with facilities for holding a desired plurality of batteries, such as 6 batteries, insulatedly spaced 60 degrees apart from each other. This spacing may be accomplished by means of integrally molded pins depending from the upper half of the case. In a modified embodiment of the invention, insulation and appropriate spacing of the batteries is achieved by means of cavities depressed into the surface of the case, each cavity being adapted to accommodate one battery.

To test the batteries without removing them from the dispenser, an insert card, having one of its surfaces metallized, is sandwiched between the two halves of the case, with its metallized surface toward the batteries. The batteries may then be tested with 2 probes, respectively contacting the metallized surface of the card and the individual batteries through holes in the upper half of the casing provided for this purpose. With card removed and trap door open, batteries may be removed from, or reinserted into, the casing by rotating circular opening into cooperating relation with the respective batteries.

DESCRIPTION OF THE PREFERRED EMBODIMENTS

Figure 1:
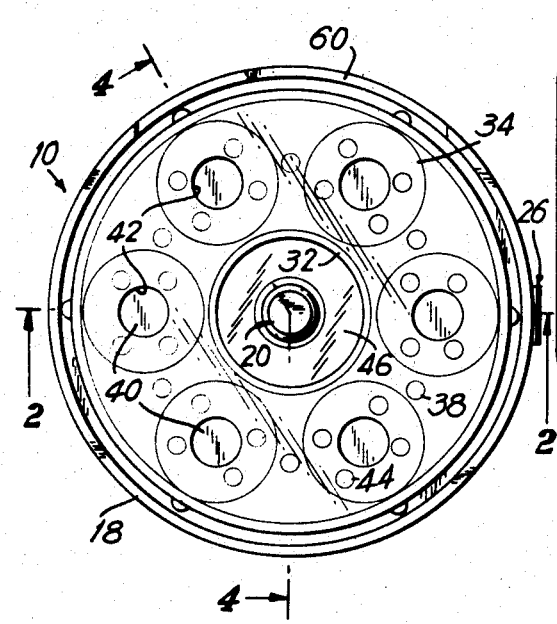
FIG. 1 is a top elevational view of a battery dispenser embodying the principles of the present invention.
Figure 2:
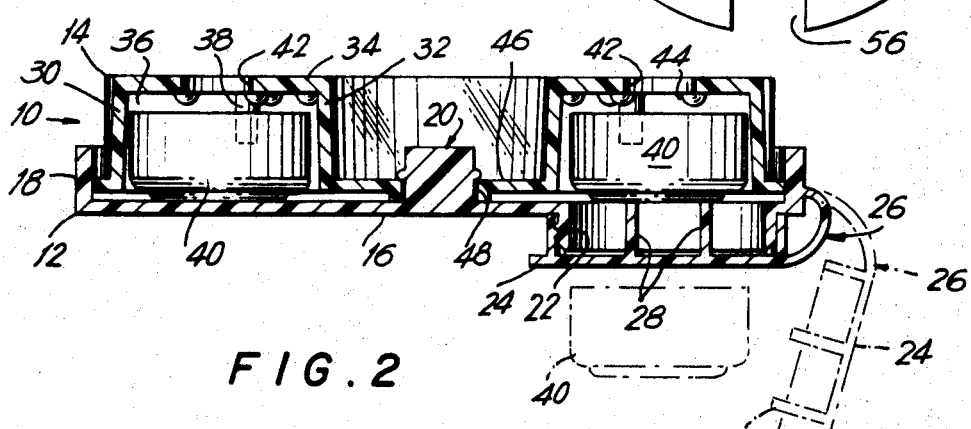
FIG. 2 is a vertical sectional view taken on line 2—2 of FIG. 1, also showing in phantom the snap cap in its open position and a battery being discharged therethrough.

Referring now more particularly to FIGS. 1 and 2, reference numeral 10 generally denotes the dispenser casing comprising a lower half 12 and an upper half 14. Considering first lower half 12, it is circular in shape having a flat bottom surface 16 and annular rim 18. An integrally formed mushroom-shaped stud, or pin 20 extends upwardly from the center of the bottom surface. A raised circular opening 22 is provided in surface 16 and is adapted to be closed by means of a snap cap 24, which is connected to the body of the lower half by means of a flexible hinge 26. A pair of parallel ribs 28 extend inwardly from the cap 24, the object of which will appear presently. The entire lower half, including its circumferential rim, mushroom-shaped stud, and self-hinged, internally ribbed snap cap is molded in one piece from a suitable opaque (white) flexible plastic, such as medium density polyethylene.

Upper half 14 of the dispenser comprises a pair of spaced circular and vertical walls 30 and 32 connected by a horizontal wall 34 and defining therebetween an annular battery storage space 36. This space is subdivided into 6 sections by means of downwardly depending integrally molded pins 38 which assure proper spacing of batteries 40 and prevent direct contact between the side walls thereof. Another important function of pins 38 is to increase the space available for air circulation within the case and around all the batteries. An aperture 42 is provided directly above each battery location through which the upper surface of the battery, constituting one of its terminals, is accessible. Four short and integrally formed protuberances or dimples 44 extend downwardly from wall 34 and around each aperture 42. The object of these dimples is not only to limit displacement of the batteries in the axial direction, but also to ensure positive air circulation by preventing the flat terminal of battery 40 from closing off testing aperture 42. Inner circular wall 32 is connected to a second horizontal wall 46 having an aperture 48 in the center thereof. The said aperture is so dimensioned as to form a rotational fit with mushroom-shaped stud 20 in the lower half 12 of the device.

From the foregoing description, operation of the dispensing device of the invention will be readily understood by those skilled in the art. To assemble the device, stud 20 is pushed through aperture 48, which will permanently secure the two halves together while permitting their rotational displacement with respect to each other. The six batteries are inserted into their respective locations either before assembly of the two halves or after assembly, passing them one by one through aperture 22, after taking off cap 24. In both cases, it is desirable to reverse the position of the device from that shown in the drawing, so that aperture 22 and cap 24 are at the top, rather than at the bottom.

Referring now to FIG. 2, batteries 40 are of the type in which the two end faces constitute the respective electrical terminals. With cap 24 in its closed position, halves 12 and 14 of the device can be readily rotated with respect to each other. When one of the batteries is brought into a position directly above the said cap, its lower face will slide on the top of ribs 28 on the inner surface of cap 24.

To dispense a battery, the two halves of the device are rotated until such battery is aligned with aperture or discharge opening 22. When cap 24 is opened, as shown in FIG. 2 in dotted lines, the selected battery will drop into the palm of the person operating the device.

Figure 3:
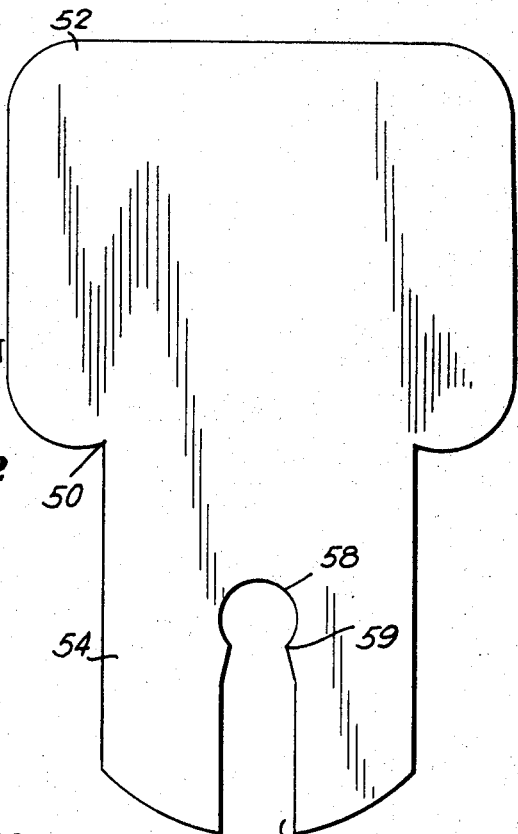
FIG. 3 is a top elevational view of an insert card, at least one surface of which is electrically conducting.

The dispensing device of the invention is so constructed and arranged as to permit checking the voltage or other electrical characteristics of the batteries without removing them from the device. For this purpose, there is provided an insert card 50, preferably made of heavy cardboard, at least the top surface of which is formed of electrically conducting metallized paper (FIG. 3). Card 50 comprises an enlarged upper or handle portion 52 and lower or contact portion 54 having an inverted U-shaped configuration defined by a slot 56 ending in a generally circular aperture 58.

To test the batteries, two different procedures may be followed. The preferred procedure is to introduce card 50 before the two case halves, 12 and 14, are assembled. This is accomplished by inserting batteries 40 into case half 14, with one terminal of each battery contacting the conducting surface of the card. The two case halves are then snapped together, stud 20 being accommodated in aperture 58 of the card. As it will be best observed in FIG. 4, the upper, conducting surface of insert card 50 will contact the lower terminal surface of all batteries. A probe 62 may now be pressed against the external portion 52 of the insert card 50 and a similar probe 64 may be pressed against the upper terminal surface of the battery to be tested through the corresponding aperture 42 in the upper half of the device. Thus, a voltmeter or other suitable measuring instrument connected to the probes will directly indicate the electrical characteristics of each of the batteries. After testing is completed, insert card 50 is withdrawn and the device is ready for dispensing one or more batteries. Withdrawal of the card is made possible by flanges 59 around the circular end 58 of the card slot, which initially serve to keep card 50 locked around stud 20, rounding off, whereupon the said stud 20 can slide along slot 56 in the card.

Figure 4:
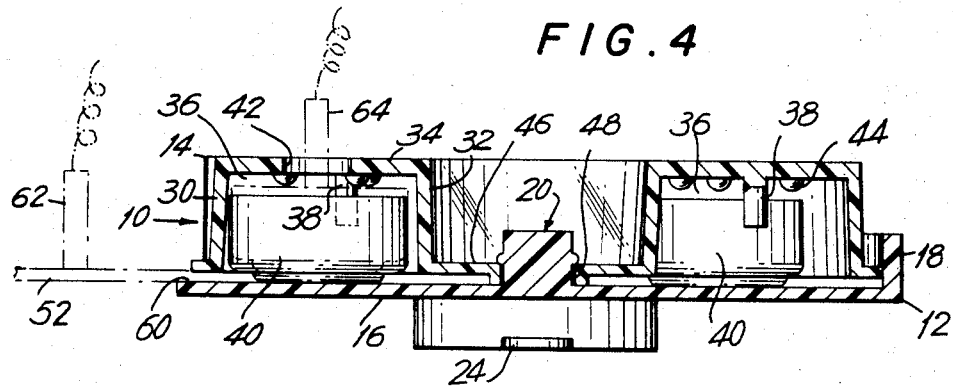
FIG. 4 is a vertical sectional view taken on line 4—4 of FIG. 1 and showing the insert card in its operative position.

Although the procedure described in the foregoing is the preferred one, it is also possible to introduce the insert card after assembly of the two case halves. This is accomplished by gripping upper part 52 of card 50 and pushing its lower part 54 between lower half 12 and upper half 14 of the case, this being made possible by having a section of rim or flange 18 of the lower half 12 cut out, as this is indicated at 60 in FIG. 1. As shown in FIG. 4, slot 56 of the insert card will be guided by stud 20, until the said stud will arrive at the generally circular end 58 of the slot. Testing of the batteries can now be carried out in the same manner as described in connection with the first procedure and the insert card may be subsequently withdrawn.

Figure 5:
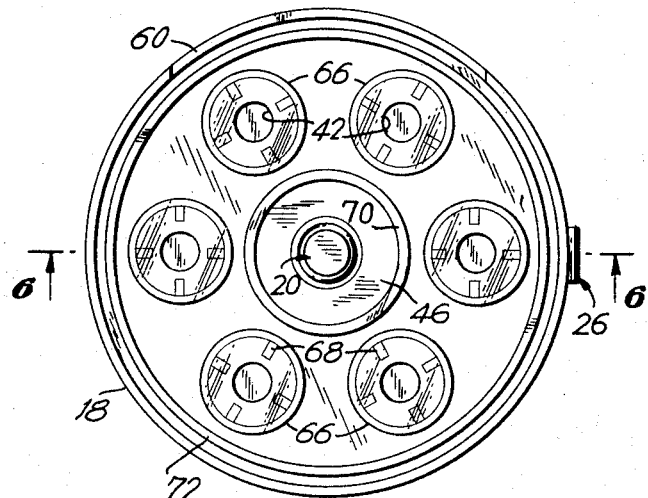
FIG. 5 is a top elevational view of a modified embodiment of the invention.
Figure 6:
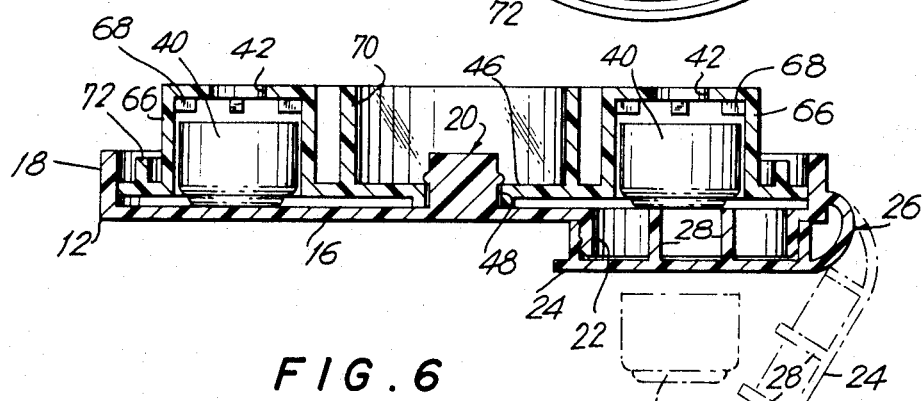
FIG. 6 is a vertical sectional view taken on line 6—6 of FIG. 5.

FIGS. 5 and 6 respectively illustrate a top elevational view and a transverse sectional view of a modified embodiment of the present invention. Lower half 12 of the dispenser is identical with the one shown in FIGS. 1 and 2 and identical reference numerals have been shown to denote corresponding parts. As to the upper half 14, the difference between the two embodiments resides in the fact that in the embodiment described in the foregoing, a single annular battery storage compartment 36 is provided which is subdivided by means of downwardly depending integrally molded pins 38. In contrast to this, in the modified embodiment, a separate cavity 66 is provided for each battery, four ribs 68 being integrally molded in the top surface of each cavity to reinforce the structure and to limit axial displacement of the batteries in the respective cavities. Inner annular rim 70 and circumferential annular rim 72 are both integrally molded with the upper half and their object is to increase rigidity of the structure. As in FIGS. 1 and 2, an aperture 42 is provided directly above each battery through which a probe may be applied to the upper terminal thereof whereas the other probe is applied to the upper surface of card 50 which is inserted between the two dispenser halves through cut out portion 60 of rim 18 of the lower half. In view of the similarity of construction, operation of the modified embodiment, such as insertion, removal and testing of the batteries will be readily understood by those skilled in the art without any detailed description.

Although the present invention has been disclosed in connection with preferred embodiments thereof, variations and modifications may be resorted to by those skilled in the art without departing from the invention.

I claim:

1. A dispensing device for batteries comprising two parts of insulating material defining therebetween space for storing a plurality of batteries uniformly arranged in a circle and out of contact with each other, means including a stud in one part and a hole in the other part to form a rotational joint between said parts, an opening in one of said parts through which individual batteries may be introduced into and discharged from said space, a closure for said opening, an aperture above and for each of said batteries through which one terminal of such batteries is accessible to a first probe, and a gap between said parts adapted to receive an insert card having a conducting surface a portion of which is in contact with the other terminal of each of the batteries and another portion of which extends from the device and is accessible to a second probe.

2. In combination with the dispensing device claimed in claim 1, an insert card having a slot adapted to cooperate with the stud of the device to guide the card into a position in which its conducting surface is in electrical contact with one terminal of each of the batteries.

3. A dispensing device for batteries comprising, a pair of circular discs having annular side walls placed adjacent each other to define a chamber therebetween, a plurality of batteries contained within said chamber means electrically insulating said batteries one from the other in said chamber, means for allowing individual batteries to egress from said chamber, conductor terminal means disposed in said chamber abutting said batteries, said terminal means having a portion external of said annular chamber wall and an aperture formed in one of said discs of said chamber above said batteries whereby said batteries may be tested prior to egress from said chamber.

4. A battery dispensing device as in claim 3 wherein said egress means is a closure cap and hinge.

References Cited

UNITED STATES PATENTS 2,829,777 4/1958 Berardinelli _____ 133—6 X
3,227,127 1/1966 Gayle _____ 206—42 X STANLEY H. TOLLBERG, *Primary Examiner.*